United States Patent
Fox (10) Patent No.: US 7,685,928 B2
(45) Date of Patent: Mar. 30, 2010

(54) STEERING MECHANISM

(75) Inventor: Peter Fox, Lancashire (GB)

(73) Assignee: Lodematic Limited, Lancashire (GB)

( * ) Notice: Subject to any disclaimer, the term of this patent is extended or adjusted under 35 U.S.C. 154(b) by 411 days.

(21) Appl. No.: 11/720,331

(22) PCT Filed: Dec. 6, 2005

(86) PCT No.: PCT/GB2005/004667

§ 371 (c)(1),
(2), (4) Date: Sep. 6, 2007

(87) PCT Pub. No.: WO2006/061590

PCT Pub. Date: Jun. 15, 2006

(65) Prior Publication Data

US 2008/0078606 A1    Apr. 3, 2008

(30) Foreign Application Priority Data

Dec. 8, 2004    (GB) ................... 0426906.4
Sep. 13, 2005   (GB) ................... 0518627.5

(51) Int. Cl.
*B62D 7/14*    (2006.01)
*B62D 5/06*    (2006.01)

(52) U.S. Cl. ............................. 92/13; 180/414; 180/417

(58) Field of Classification Search ............ 92/13; 60/385; 91/536; 180/414, 415, 417
See application file for complete search history.

(56) References Cited

U.S. PATENT DOCUMENTS

| 4,781,262 A | * | 11/1988 | Nakamura et al. | ........... 60/386 |
| 4,884,647 A | * | 12/1989 | Mimuro et al. | .............. 60/385 |
| 5,086,863 A | * | 2/1992 | Tischer | ...................... 92/13.1 |
| 5,099,939 A | * | 3/1992 | Elser et al. | .................. 180/414 |

FOREIGN PATENT DOCUMENTS

WO    WO 89/07065    8/1989

* cited by examiner

*Primary Examiner*—Thomas E Lazo
(74) *Attorney, Agent, or Firm*—Egbert Law Offices PLLC (57) ABSTRACT

A powered steering mechanism can operate in a steering mode or in a powered self-centering mode. The mechanism of the present invention includes a cylinder into and out of which can reciprocate a rod. The rod is provided with a fixed piston that defines a first pressure chamber and a second pressure chamber. First and second inlet/outlet steering ports are provided in the pressure chambers through which a pressurizing fluid can flow into or out. The cylinder is also adapted to provide powered self-centering of the fixed piston and thereby the steering mechanism itself by the floating pistons that are located within the pressure chambers. First and second inlet/outlet centering ports are also provided in pressure chambers, through which fluid can flow into the chambers, causing floating pistons to move towards a central position and enabling the fixed piston to be moved and retained.

20 Claims, 8 Drawing Sheets

STEERING MECHANISM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a powered steering mechanism for a vehicle and, in particular but not exclusively, to a powered steering mechanism for one or more secondary axles of a vehicle, which may comprise a motor vehicle or trailer.

2. Description of Related Art Including Information Disclosed Under 37 CFR 1.97 and 37 CFR 1.98.

Conventionally, a vehicle with two or more axles will have its front or primary axle steered. Its other secondary axle or axles need not have any steering mechanism even though one or more of them may be driven. However, it can be an advantage if one or more of the secondary axles are also steered, for example, to increase maneuverability of the vehicle, to improve wheel tracking, to improve the vehicle's fuel economy and to reduce tire wear. Also, it may be advantageous to have the means to disable the steering of any secondary axle and, at the same time, to center the wheels to a neutral, straight-ahead position, and to maintain them in this position. The steering of secondary axles is usually controlled by the primary steering mechanism so that any movement of the primary steering mechanism results in an equivalent, proportional movement of the secondary steering mechanism. Control can be achieved by a mechanical linkage but this is heavy and bulky, and a centering arrangement for such a control would be difficult to arrange. Hence, normal conventional practice is to provide a power unit for steering secondary axles and to provide an auxiliary centering unit for maintaining the secondary axles in a neutral, straight-ahead position when required.

Conventionally, such a power unit takes the form of a hydraulic cylinder that is arranged between a fixed point on a vehicle's frame and a steering linkage. Within the cylinder, a piston reciprocates to provide the power assisted steering. The piston is connected to a rod that is connected to the steering linkage. Fluid pressure, on one or another side of the piston, as controlled by the valve unit, moves the rod and thereby the steering linkage in the required direction. The amount of fluid pressure applied to the piston by the valve unit depends on the force applied to the vehicle steering wheel by the driver.

The centering unit typically comprises either a pneumatic bellows which is separate from the power unit or an additional hydraulic cylinder that may or may not be attached to the steering cylinder to power the steering towards a central position. However, this may not necessarily power the steering into the actual central position, and separate mechanical means are often provided in addition to hold the unit in the central position once reached.

The object of the present invention is to simplify the aforementioned conventional arrangement with consequent savings in efficiency and cost and to provide a powered steering mechanism that combines the steering and centering mechanisms within the same cylinder.

BRIEF SUMMARY OF THE INVENTION

According to the present invention there is provided a powered steering mechanism comprising a cylinder into and out of which can reciprocate a rod that is provided within the cylinder with a piston fixed relative thereto. The cylinder defines a first pressure chamber on one side of the piston and a second pressure chamber on the other side of the fixed piston. First and second inlet/outlet steering ports are provided in the first and second pressure chambers respectively through which a pressurizing fluid can flow into or out of the first or second chamber. The piston is caused to move one way or the other within the cylinder dependent on the chamber that is pressurized. Thereby, the rod is moved into or out of the cylinder to provide steering movement. The cylinder is also adapted to provide powered self-centering of the piston and thereby the steering mechanism by the provision of first and second floating pistons that are located respectively within the first and second pressure chambers on opposite sides of the fixed piston. There are also first and second inlet/outlet centering ports in the first and second pressure chambers, respectively, through which fluid can flow into the first and second chambers to pressurize first sides of the floating pistons, causing the pistons to move towards a central position within the cylinder and thereby causing the fixed piston to be moved to and to be retained at the central position within the cylinder.

Preferably, a stop means is provided within the cylinder to prevent movement of each of the floating pistons into a position wherein the fixed piston would be moved to an over-center position by movement of the floating piston within its respective pressure chamber. Advantageously, the stop means comprises a central section of the cylinder with a reduced diameter.

Preferably also, the central, reduced diameter central section of the cylinder defines that portion of the cylinder surface over which the fixed piston can travel.

Preferably also, the first and second inlet/outlet steering ports are respectively located adjacent the stop means to enable fluid flow into the first and second chambers to occur on the opposite sides of the floating pistons from the first sides.

Preferably also, the cylinder comprises first and second end pieces that define the outer end walls of the first and second pressure chambers and thereby limit travel of the floating pistons within the first and second pressure chambers.

Preferably also, the first and second inlet/outlet centering ports are respectively located adjacent the first and second end pieces to enable fluid flow into the first and second chambers to pressurize the first sides of the floating pistons.

Preferably also, valve means are provided to control the flow of fluid through each of the inlet/outlet ports and thereby enable the mechanism to be used in either a steering mode or in a powered self-centering mode.

Preferably also, when the steering mechanism is used in a steering mode, the valve means provided for the first and second inlet/outlet steering ports are operated such that when one of the valve means is open, the other is closed and vice versa.

Preferably also, when the steering mechanism is used in a powered self-centering mode, the valve means provided for the first and second inlet/outlet centering ports operate such that they are both open.

Preferably also, when the steering mechanism is used in a powered self-centering mode, the valve means provided for the first and second inlet/outlet steering ports are both open.

Preferably also, when the steering mechanism is used in a powered self-centering mode, the pressure of the fluid supplied to the first and second pressure chambers is the same.

Preferably also, pilot operated check valves are provided to control fluid flow out of the first and second inlet/outlet centering ports.

Preferably also, when the steering mechanism is used in a steering mode only one or other of the pilot operated check valves is open at any given time.

Preferably also, the pilot operated check valves are operationally linked respectively to fluid supply lines to the first and second inlet/outlet steering ports. An increase in pressure of the fluid in the fluid supply line to either the first or the second inlet/outlet steering port opens the pilot operated check valve for either the second or the first inlet/outlet centering port respectively. Thereby, movement of the floating piston is allowed in the second or first pressure chamber respectively. It will be appreciated that this allows the floating piston in the pressure chamber, which is not being pressurized and into which the rod is moving, to be moved by the fixed piston and rod. Movement of the floating piston in the other chamber, which is being pressurized by the fluid, is prevented. The latter floating piston does not therefore move in preference to the movement of the fixed piston and rod, which would lead to an undesirable delay in power assistance to the steering.

Preferably also, each pilot operated check valve is also associated with a second check valve that permits hydraulic fluid to flow respectively to the locking side of the first and second floating pistons.

Preferably also, each of the second check valves is associated with a flow restrictor that ensures there is a pressure differential on the two sides of the respective first and second floating pistons such that it is biased towards the central, locking position.

Alternatively, in place of the flow restrictors, mechanical spring means are preferably located within the cylinder associated with the first and second floating pistons in order to bias each of the first and second floating pistons independently towards the center position with a predetermined force.

Preferably, the mechanical spring means comprise first and second coil springs that bear at one end against sides of the cylinder, defining, respectively, part of the first and second pressure chambers on opposite sides of the fixed piston and that bear at an opposite end against shoulders defined respectively by the first and second floating pistons.

Preferably also, the valve means provided for the first and second inlet/outlet centering ports includes a valve linked to a drain line to enable any hydraulic fluid trapped within the cylinder to be discharged when the steering mechanism is being used in a powered self-centering mode.

Although it is primarily it is expected that the present invention will be used to provide a powered steering mechanism for a secondary axle of a vehicle, it would be clear to a man skilled in the art that the mechanism could also be used with a primary, steered axle. It will also be apparent that such the secondary axles could be located on a motor vehicle itself or on a trailer.

BRIEF DESCRIPTION OF THE SEVERAL VIEWS OF THE DRAWINGS

The present invention will now be described by way of example with reference to the accompanying drawings.

DETAILED DESCRIPTION OF THE INVENTION

In all of the embodiments described herein, the same reference numerals are used for identical components thereof or for components with an equivalent function.

Figure 1:
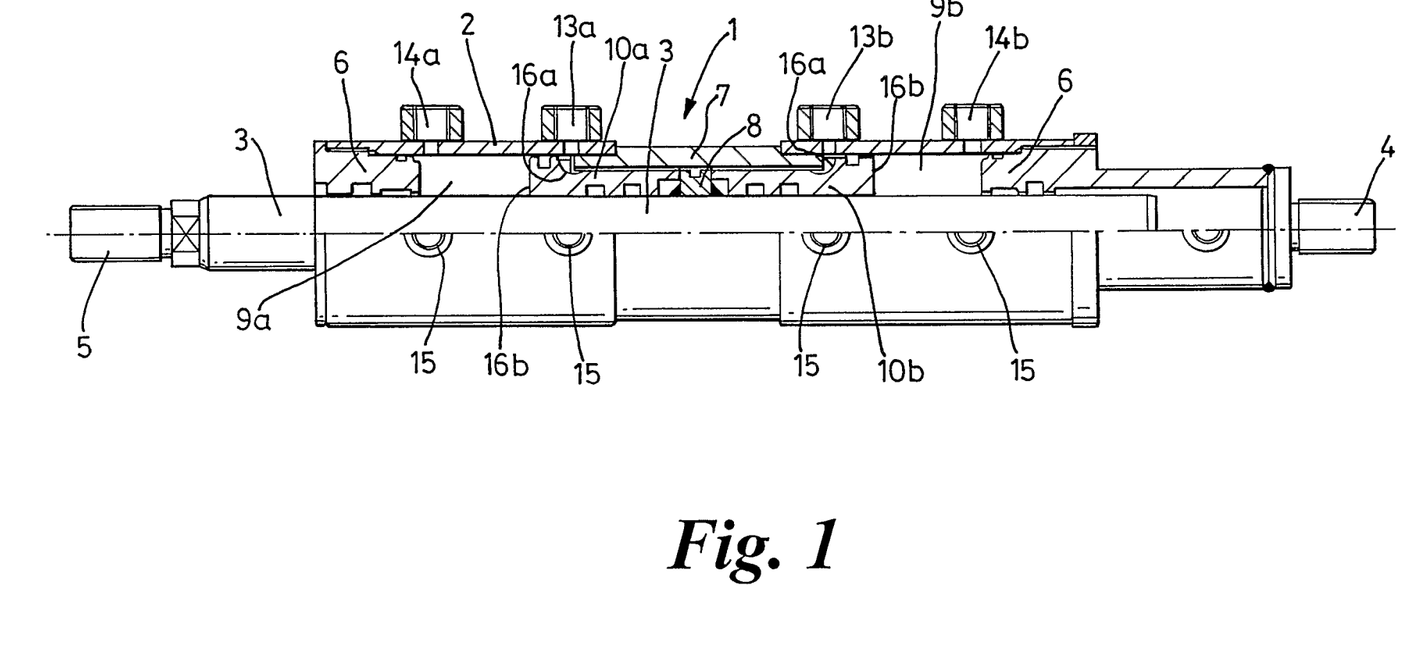
FIG. 1 is a part longitudinal sectional view of a first embodiment of hydraulic cylinder for use in a powered steering mechanism according to the present invention, the cylinder being shown in a self-centered mode with all of the pistons forming a part thereof in a central position.

With reference in particular to the embodiment shown in FIG. 1, the hydraulic cylinder 1 of the steering mechanism comprises a casing 2 into and out of one end of which can reciprocate a rod 3. At its closed end, the casing is provided with a threaded boss 4 to enable the cylinder to be attached to a fixed point on a vehicle's frame. At its other end, the projecting end of the rod 3 is also provided with a threaded boss 5 for attachment to a steering linkage. The ends of the casing 2 are closed by end pieces 6 that comprise fluid seals through which the rod 3 reciprocates within the casing 2.

The central interior section 7 of the casing 2 is of a reduced internal diameter. This section defines a cylindrical surface over which travels a fixed piston 8 that is secured to the rod 3. The length of the section 7 therefore needs to be as long as the required stroke of the piston 8 and therefore of the rod 3. Similarly, the relative dimensions of the rod 3 and cylinder 1 should be arranged so that when the piston 8 is at the central point of the section 7, this point defines the centered position of the cylinder 1 at which the wheels of the vehicle that are controlled by the steering mechanism are in a neutral or forward-running position. The piston 8 is shown in such a position in FIGS. 1, 2, 5 and 6.

Between the fixed piston 8 and each of the end pieces 6, the casing 2 defines first and second pressure chambers 9a and 9b respectively. Located within each of these pressure chambers 9a and 9b is a floating piston 10a and 10b respectively. The floating pistons 10a and 10b are free to move under the influence of fluid pressure on either side thereof independently of the rod 3 but may also be forced to move by contact with the fixed piston 8. Similarly, movement of either of the floating pistons 10a, 10b into contact with the fixed piston 8 will force the latter and the associated rod 3 to move.

In a second embodiment of cylinder 1, as shown in FIGS. 2 to 6, the floating pistons 10a, 10b are not contacted directly by the fixed piston 8 but by a portion 11 of the rod 3 which is of enlarged diameter. This portion 11 is of the same length as the central interior section 7 of the casing 2 so that the floating pistons 10a, 10b may be forced to move by contact with the adjacent end face 12 of the portion 11 or may themselves move the rod 3 and associated fixed piston 8. Essentially, therefore, there is no difference in operation between the first and second embodiments.

The pressure chambers 9a and 9b are each provided with two fluid inlet/outlet ports 13a, 14a and 13b, 14b respectively apart from conventional bleed ports 15 (FIG. 1) that are only used during servicing of the cylinder 1. It will be appreciated that all of these fluid inlet/outlet ports 13a, 14a and 13b, 14b are positioned to enable the pressure chambers 9a and 9b to be pressurized with fluid on one or other side of the respective floating piston 10a, 10b and to permit fluid on the other side of the floating piston 10a, 10b to be forced out from the chamber 9a, 9b as the pistons 10a, 10b and the fixed piston 8 move within the casing 2. The particular ways in which this happens are described in detail below.

Inlet/outlet ports 13a and 13b are located either intermediate of the center point of the section 7 and the respective end of the section 7 or at this respective end of the section 7, such that fluid pumped into the first or second pressure chamber 9a, 9b via the respective port 13a, 13b will pressurize that side 16a of the floating piston 10a, 10b facing towards the section 7. These ports 13a and 13b comprise first and second inlet/outlet steering ports respectively. The other fluid inlet/outlet ports 14a and 14b are located at the ends of the casing 2 adjacent the end pieces 6, such that fluid pumped into the first or second pressure chamber 9a, 9b via the respective port 14a, 14b will pressurize the other side 16b of the floating piston 10a, 10b facing towards the end pieces 6. These ports 14a and 14b comprise first and second inlet/outlet centering ports respectively and are supplied with fluid from a common manifold 17 (FIG. 2) in order to ensure that the pressure of the fluid supplied to the chambers 10a, 10b via these ports is the same.

Figure 5:
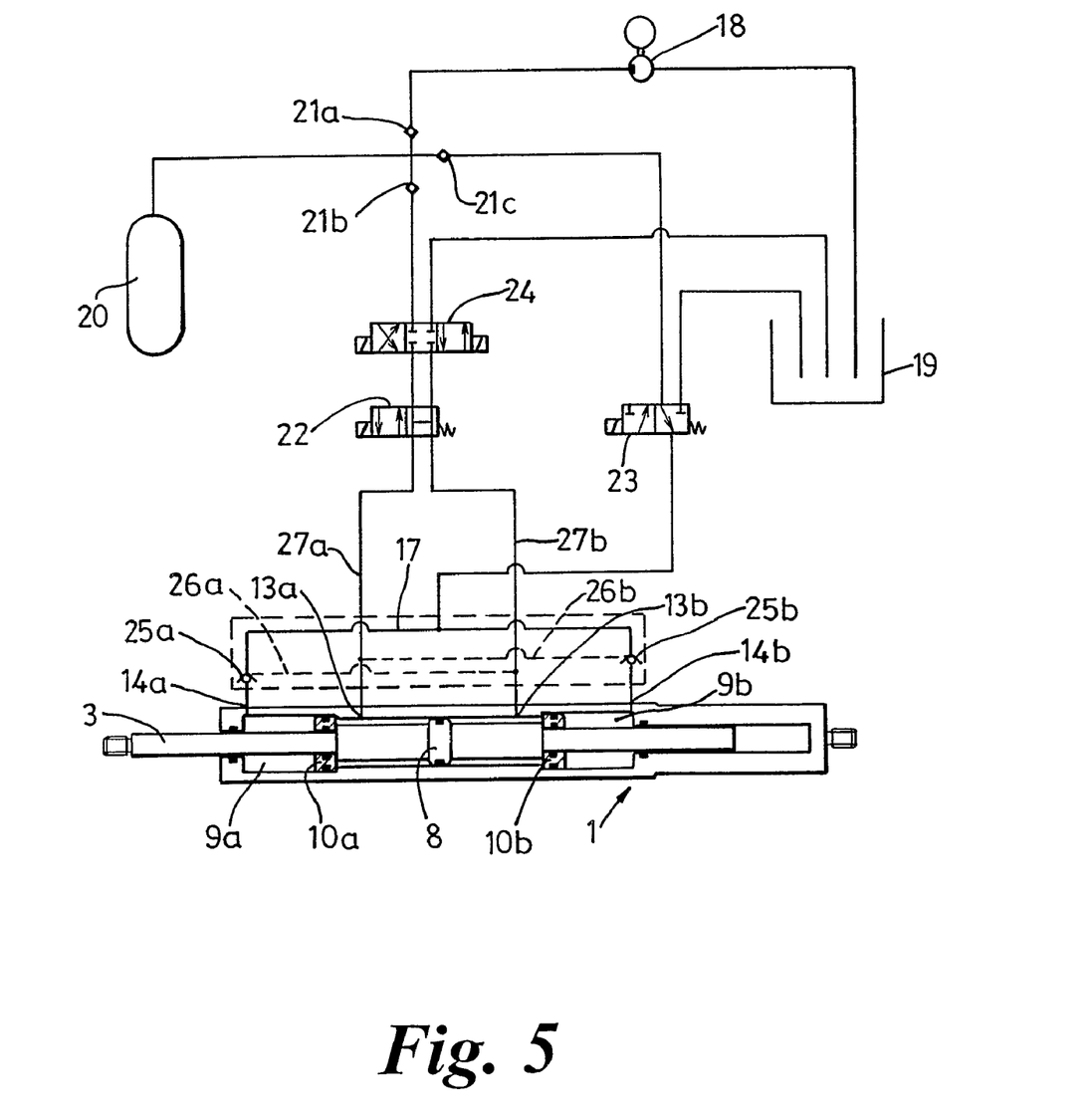
FIG. 5 is a schematic view of a hydraulic circuit linked to a hydraulic cylinder in a self-centered mode as shown in FIG. 2.

In the steering mechanism of the present invention, the cylinder 1 of either the first or second embodiment referred to above is associated with a control unit (shown in FIG. 6 only) that is linked to the steering wheel of a vehicle and also linked to a hydraulic circuit, a first example of which is shown in FIG. 5 and that will now be described. The hydraulic circuit circulates hydraulic fluid through the cylinder 1 under control of the control unit. The hydraulic circuit, as is conventional, includes a motorized pump 18, fluid reservoir 19, an accumulator 20 and check valves 21a, 21b, and 21c. In addition, associated with each of the fluid inlet/outlet ports 13a, 13b and 14a, 14b, there are locking valve means 22 associated with the fluid lines to the steering inlet/outlet ports 13a, 13b, and there is a locking valve 23 associated with the common line to the manifold 17 of the centering inlet/outlet ports 14a, 14b. A steering valve arrangement 24 is also provided for the fluid lines to the steering inlet/outlet ports 13a, 13b and operates such that fluid flow is only allowed into one of the pressure chambers 9a, 9b at any given time. The locking valve means 22 and valve 23 are standard control valves which can open or close each of the fluid lines to the fluid inlet/outlet ports 13a, 13b and 14a, 14b in response to a signal from the control unit. Once the locking valve means 22 has been energized into a steering mode, then the steering valve arrangement 24 is used to control the quantities of fluid permitted to flow into or out of each of the pressure chambers 9a, 9b under the control of the control unit.

Pilot operated check valves 25a and 25b are also provided to control fluid ingress and outflow through the centering ports 14a and 14b. These valves 25a and 25b are linked to the control unit and also respectively, via pilot lines 26a, 26b, to fluid lines 27b, 27a, supplying fluid to the pressure chamber 9b, 9a opposite to that controlled by the valve 25a, 25b itself. The valves 25a and 25b can therefore be opened in response to a signal from the control unit to permit fluid flow through into the pressure chambers 9a and 9b. However, as check valves, they do not allow fluid flow in a direction out of the respective pressure chambers 9a, 9b unless they are triggered by an increase in pressure in the fluid lines 27b, 27a respectively when they will then open to permit fluid flow out of the pressure chamber 9a, 9b to which they are linked. The reason for this is explained below.

Figure 3:
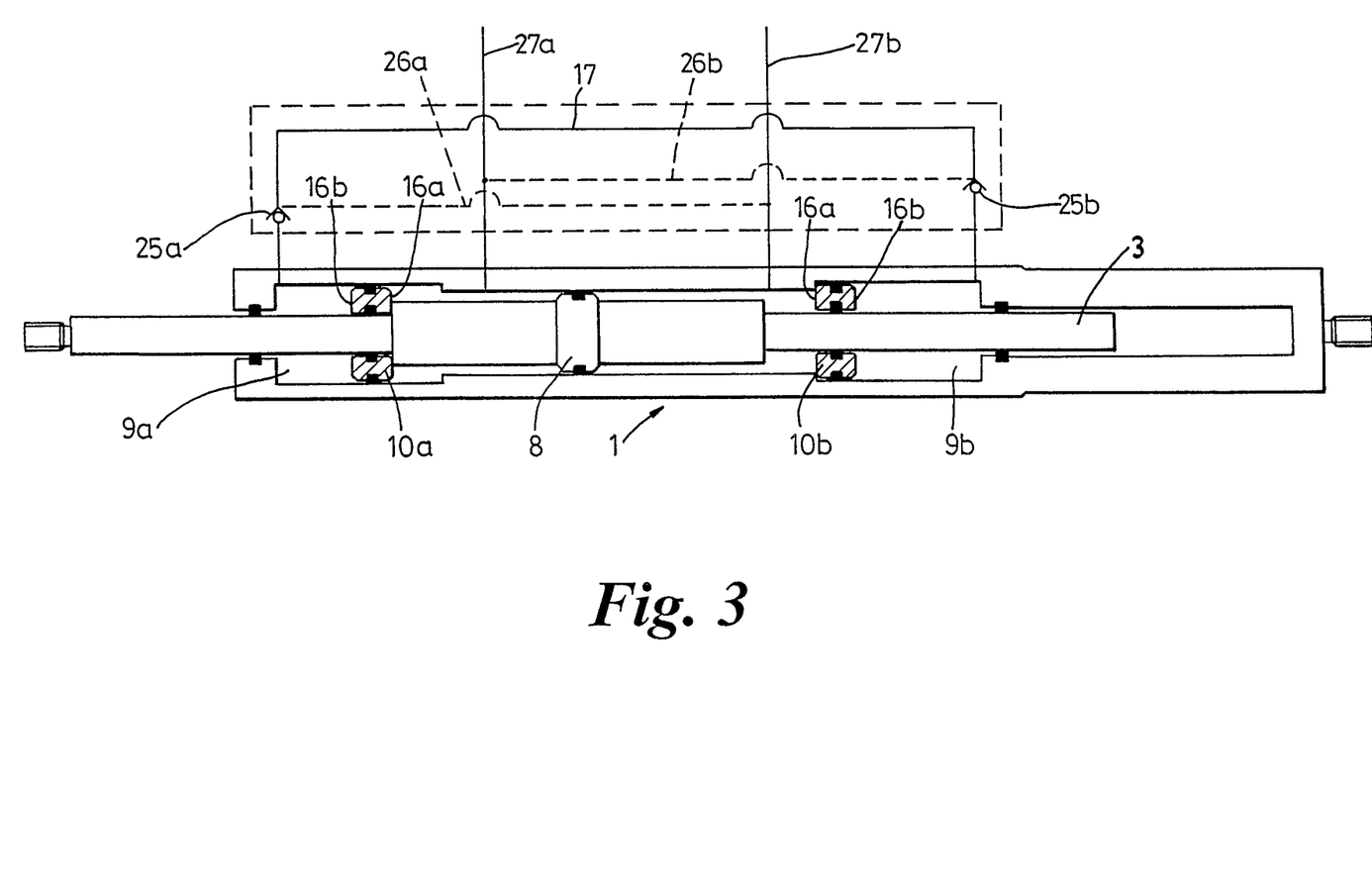
FIG. 3 is a schematic view similar to that of FIG. 2, but showing the cylinder when in use shortly after adopting a steering mode.
Figure 4:
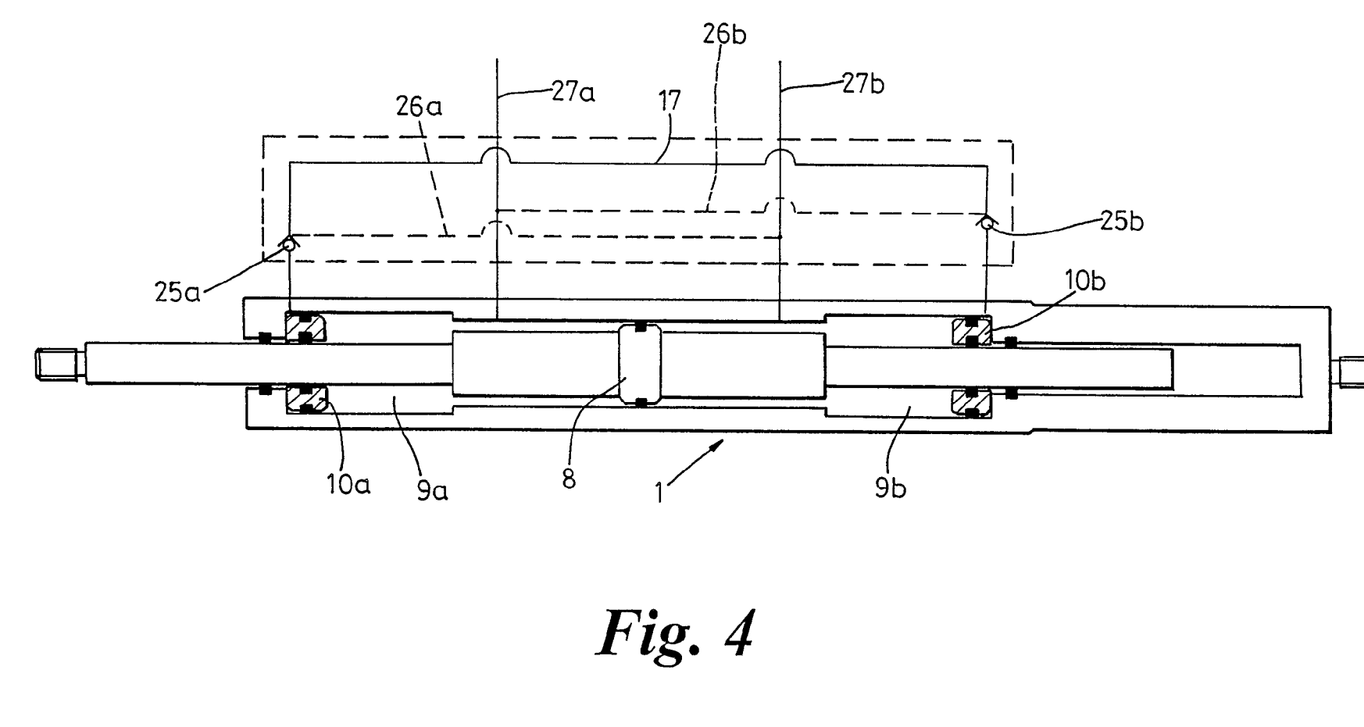
FIG. 4 is a schematic view similar to that of FIG. 3, showing the cylinder after continued use in a steering mode.

The method of operation of the steering mechanism will now be described with particular reference to FIGS. 2 to 4.

As indicated above, the steering mechanism of the invention can operate in two modes, a steering mode in which the cylinder 1 provides power assistance to the steering linkage of a vehicle, and a self-centering mode when the cylinder 1 will power the steering linkage into a centered or neutral position.

Figure 2:
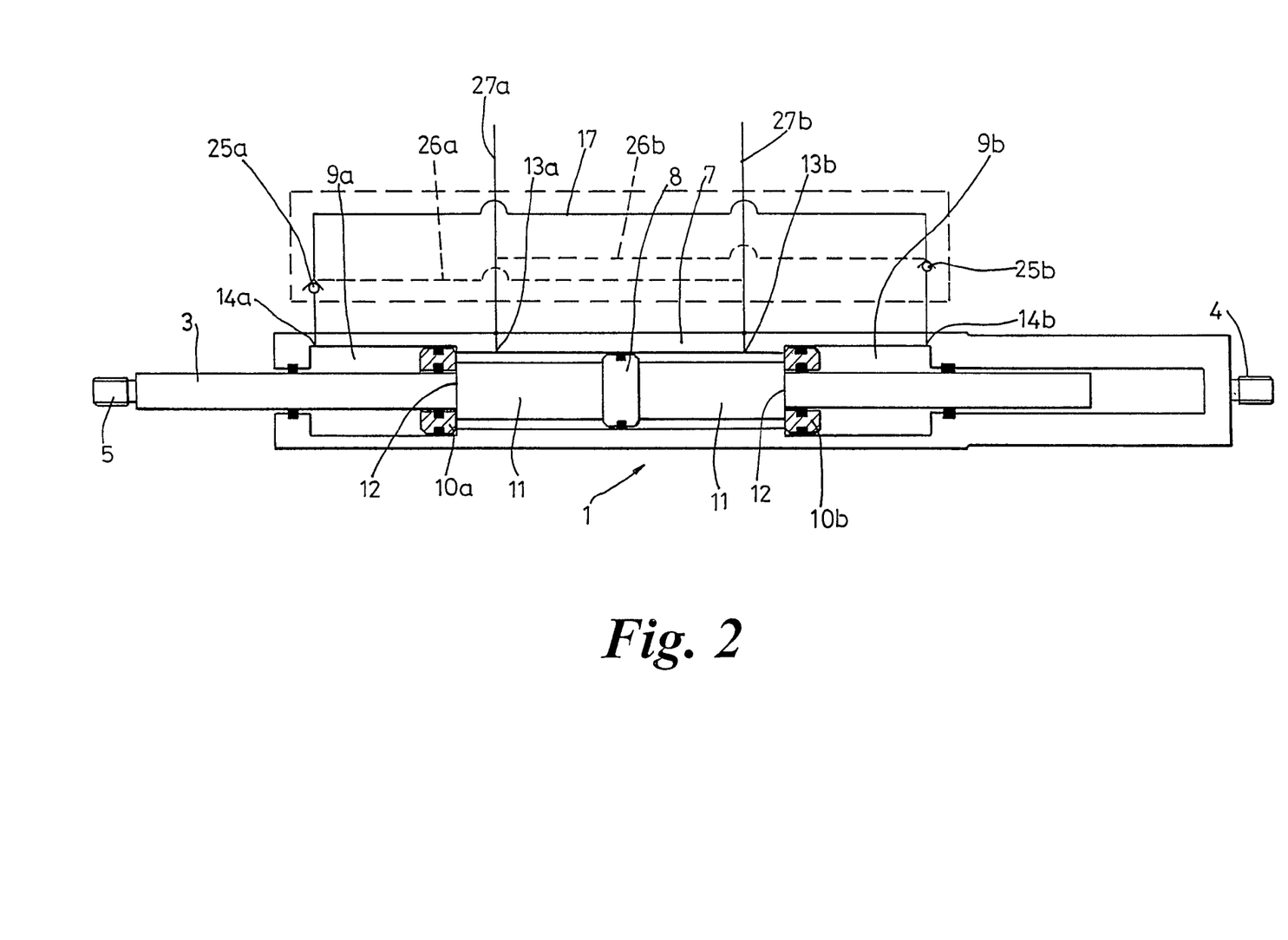
FIG. 2 is a schematic longitudinal sectional view of a second embodiment of hydraulic cylinder in a self-centered mode similar to that of FIG. 1.

Assuming that the steering mechanism is initially in a centered position, as shown in FIG. 2, the cylinder 1 will operate in a steering mode when a turning force is applied to the vehicle steering wheel by the driver. The control unit will then operate to energize the locking valve means 22 and valve 23 into a steering mode. Dependent on which way the steering wheel is turned, the control unit will thereafter operate the steering valve arrangement 24 to permit fluid flow into or out of the respective pressure chamber 9a or 9b via the inlet/outlet port 13a or 13b. Assuming that the control unit instructs the valve arrangement 24 to permit fluid to be pumped into the chamber 9b then, as shown in FIG. 3, the fluid pressure will force the fixed piston 8 and rod 3 to the left. Pressure in the pilot line 26a will also cause pilot check valve 25a to open thereby permitting fluid flow out of the pressure chamber 9a in order that when the floating piston 10a is contacted either by the fixed piston 8 (first embodiment) or by the end face 12 of the portion 11 of the rod 3 (second embodiment), the rod can move to the left within the chamber 9a. It is important that the other pilot operated check valve 25b remains closed thereby preventing movement of the floating piston 10b. If pilot operated check valve 25b were not present or permitted to open, it would allow the floating piston 10b to move under pressure of the fluid in preference to the movement of the fixed piston 8 and rod 3. This is clearly not desirable as it would lead to a delay in power assistance to the steering.

Should the steering wheel now be turned in the opposite direction, the control unit will cause the steering valve arrangement 24 to operate in an opposite fashion to permit fluid to be pumped into the chamber 9a. Pilot check valve 25a will therefore also close as the pressure in pilot line 26a drops, but pilot line 26b will be pressurized thereby opening pilot check valve 25b. Fluid flow will then be permitted out of the pressure chamber 9b so that when the floating piston 10b is contacted either by the fixed piston 8 (first embodiment) or by the end face 12 of the portion 11 of the rod 3 (second embodiment), it can move to the right within the chamber 9b.

Hence, as the steering wheel is turned one way or the other, the rod 3 will be forced further into or out of the casing 2 thereby to provide the required degree of power assistance to the steering linkage attached thereto. Continued operation of the cylinder in a steering mode with alternating fluid pressure into and out of the pressure chambers 9a and 9b will progressively push both floating pistons 10a, 10b to their fully out position, as shown in FIG. 4, wherein their faces 16 are in contact with the end pieces 6.

Self-centering occurs as follows. First, under direction from the control unit 17 all of the locking valves 22 and 23 are opened and fluid is pumped into both pressure chambers 9a and 9b through the centering inlet/outlet ports 14a and 14b via the manifold 17. The valve means 22 controlling the steering inlet/outlet ports 13a and 13b allows fluid to egress from the pressure chambers 9a, 9b as it will be appreciated that as fluid is pumped into the chambers 9a, 9b through the ports 14a, 14b the floating pistons 10a, 10b will both move towards the center of the casing 2.

Whichever piston 10a, 10b contacts the fixed piston 8 and rod 3 (first embodiment) or end face 12 of the rod 3 (second embodiment) first will move it too in the same direction. As the chambers 9a and 9b are both being pressurized with the same fluid pressure, the cylinder 2 will self-center and adopt a position as shown in FIGS. 1, 2 and 5 with the fixed piston 8 retained at the central point of the section 7. Hence, the steering linkage attached to the rod 3 will be forced to adopt a neutral position and the wheels of the vehicle powered into a forward facing central position.

Figure 6:
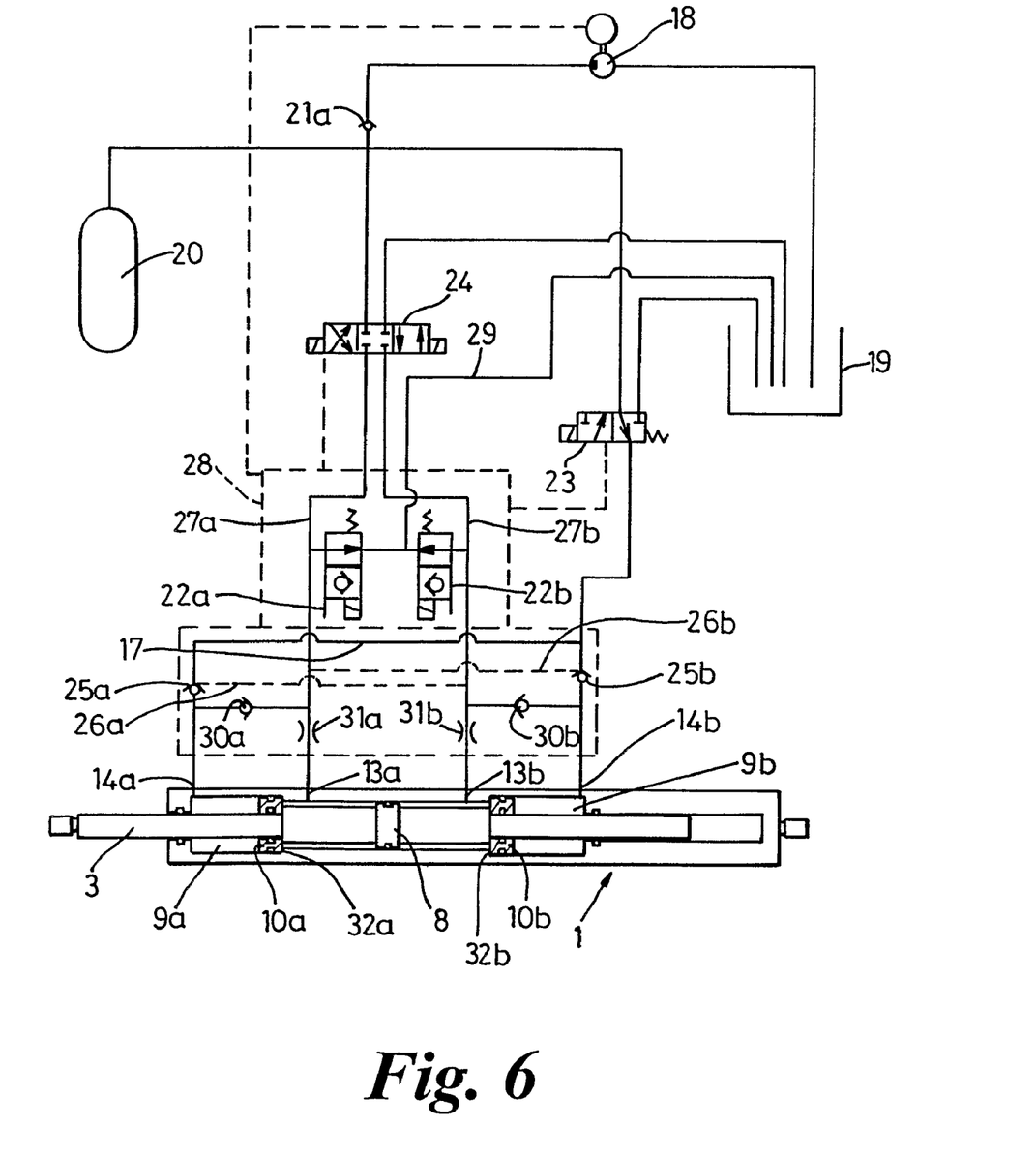
FIG. 6 is a schematic view similar to that of FIG. 5 but with a modified hydraulic circuit.

In a modified hydraulic circuit, as shown in FIG. 6, a control unit 28 is again linked to the steering wheel of a vehicle and to the hydraulic circuit that again circulates hydraulic fluid through the cylinder 1 under control of the control unit 17. In this circuit the locking valve means 22 now comprises a first valve 22a, that operates in a similar way to the single locking valve means 22 of FIG. 5, and a second valve 22b. This second valve 22b is linked to the valve 22a and to a drain line 29 back to the fluid reservoir 19. This enables any hydraulic fluid trapped within the cylinder 1 can be discharged back to the reservoir 19 when the mechanism has been energized into a centering mode. In addition, the check valves 21b and 21c are omitted but two additional check valves 30a and 30b and associated flow restrictors 31a and 31b respectively are provided. Each of the check valves 30a, 30b allows hydraulic fluid to flow to the locking side of the floating piston 10a, 10b respectively and its associated flow restrictor 31a, 31b ensures that there is always a pressure differential on the two sides 16a, 16b of the floating piston 10a, 10b respectively, biasing it towards the central, locking position at all times. The check valves 30a, 30b thereby ensure that the floating pistons 10a, 10b are always biased towards the center of the cylinder 1 so that they remain in contact with either the fixed piston 8 (or the associated end face 12 of the rod 3) or the respective stop shoulder 32a, 32b provided by the central interior section 7 of the casing 2. This, in turn, ensures that the mechanism provides an instant response to a demand for centering, the check valves 30a, 30b only permitting hydraulic fluid for locking the cylinder 1 to be directed to the floating pistons 10a, 10b.

Figure 7:
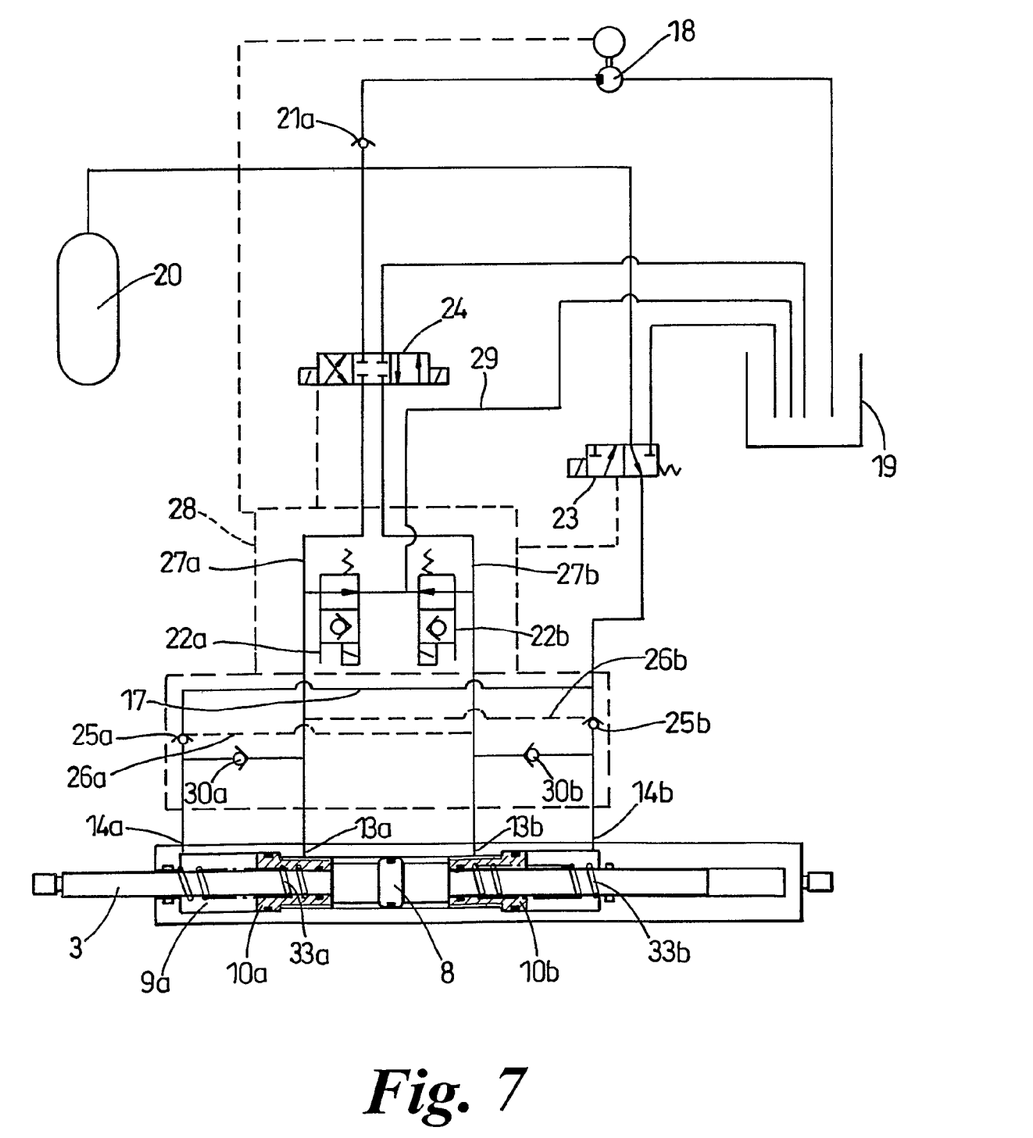
FIG. 7 is a schematic view similar to that of FIG. 5 but with a differently modified hydraulic circuit and with a third embodiment of hydraulic cylinder.
Figure 8:
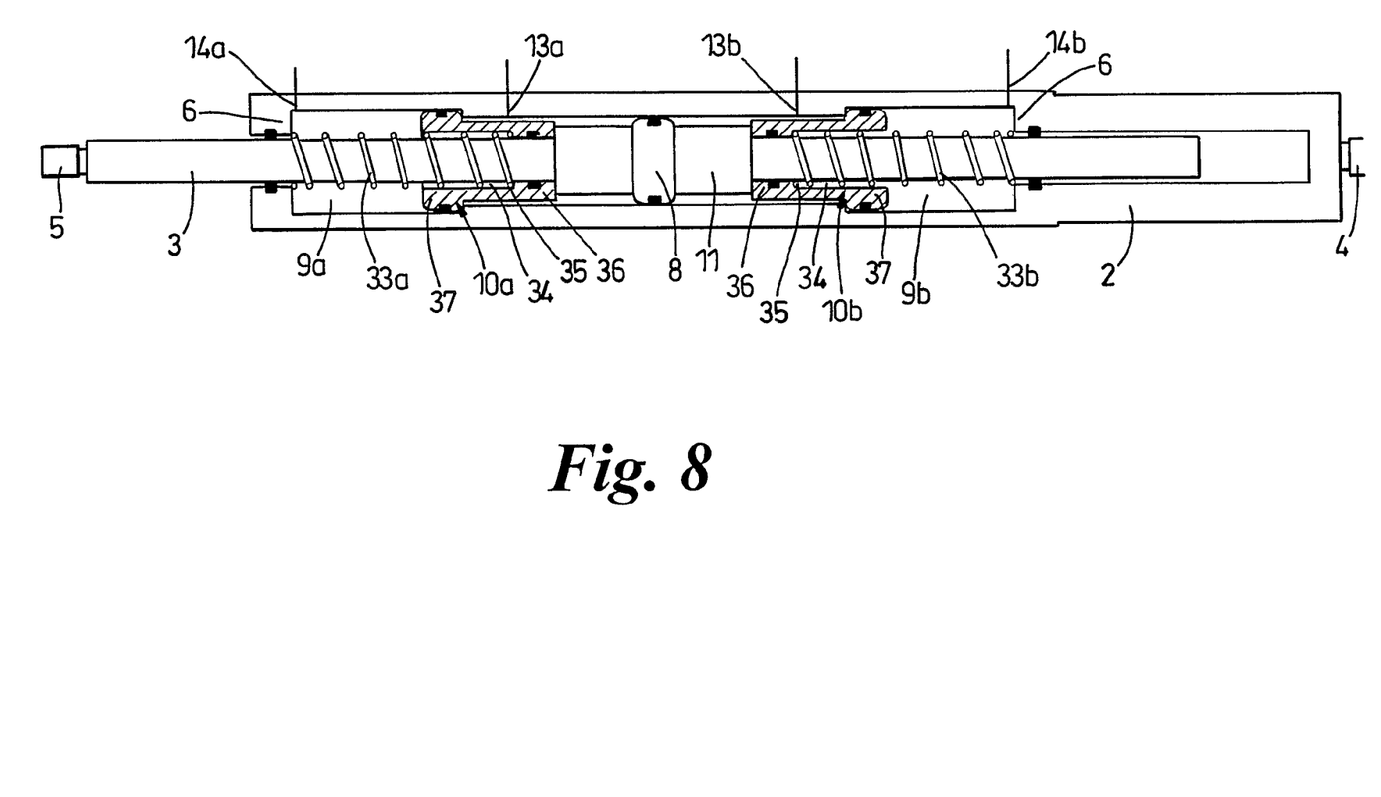
FIG. 8 is a schematic longitudinal sectional view of the third embodiment of hydraulic cylinder in a self-centered mode.

A differently modified hydraulic circuit is shown in FIGS. 7 and 8. This circuit is very similar to that shown in FIG. 6 and described above. The locking valve means 22 again comprises a first valve 22a and a second valve 22b which is linked to the valve 22a and to a drain line 29 back to the fluid reservoir 19. The check valves 21b and 21c are again omitted and the two additional check valves 30a and 30b are provided. However, in this circuit, the flow restrictors 31a and 31b are also omitted and in their place mechanical coil springs 33a and 33b are provided. These springs 33a and 33b are located within the cylinder 1 respectively between the end pieces 6 and the adjacent floating pistons 10a and 10b. In order to seat the springs 33a and 33b within the cylinder and retain them in position, the floating pistons 10a and 10b can be modified as shown in FIG. 8 such that they are elongated to form a recess 34 defining therein a shoulder 35 between a first portion 36 that is sealed with respect to the rod 3 and a second portion 37 that is sealed with respect to the interior of the casing 2 of the cylinder 1. The springs 33a and 33b are coiled around the rod 3 and bear at one end against the shoulders 35 of the respective pistons 10a and 10b and at their other ends against the end pieces 6.

It will be appreciated that the springs 33a and 33b respectively create a known mechanical force that biases the floating pistons 10a, 10b independently towards the center position. They therefore act in a similar way to the flow restrictors 31a, 31b as shown in FIG. 6. As before, each of the check valves 30a, 30b allows hydraulic fluid to flow to the locking side of the floating piston 10a, 10b respectively, but the springs 33a, 33b ensure that there is always a known force acting on each of the floating pistons 10a, 10b respectively, biasing it towards the central, locking position at all times to eliminate any centering delay. The use of the springs 33a and 33b rather than the flow restrictors 31a, 31b has the advantage that the pressure differential created by the flow restrictors 31a, 31b on the two sides 16a, 16b of the floating piston pressure can be imprecise and difficult to predict but the springs 33a and 33b will always act with a known mechanical force as predetermined beforehand by the choice of springs used.

In most circumstances it is expected that the steering mechanism of the present invention will be operated hydraulically using oil. However, it will be appreciated that it could also be operated pneumatically with suitable changes as would be obvious to a man skilled in the art.

It will also be appreciated by those skilled in the art that the steering mechanism can be linked to servo mechanisms and controls in a conventional manner to provide power assistance to other wheels of a vehicle to trailer.

I claim:
1. A powered steering mechanism comprising:
a cylinder having a rod, said rod being provided within said cylinder and being able to reciprocate into and out of said cylinder;
a piston fixed to said rod, said cylinder defining a first pressure chamber on one side of said piston and a second pressure chamber on the other side of said piston, said first pressure chamber and said second pressure chamber having first and second inlet/outlet steering ports respectively, said first pressure chamber and said second pressure chamber having a pressurizing fluid flowing into or out of the first or second chamber through said first and second inlet/outlet steering ports, said piston being moved one way or the other within said cylinder dependent on wherein a chamber is pressurized, said rod being moved into or out of said cylinder to provide steering movement,
wherein said cylinder is adapted to provide powered self-centering of said piston and a steering mechanism connected to said rod, said first and second pressure chambers having first and second floating pistons located respectively within the first and second pressure chambers on opposite sides of said piston and first and second inlet/outlet centering ports into the first and second pressure chambers respectively, the first and second chambers having fluid flowing through the pressure chambers and the centering ports to pressurize first sides of the floating pistons, the floating pistons moving towards a central position within said cylinder, said piston being moved to and retained at said central position within said cylinder.

2. The mechanism as claimed in claim 1, further comprising:
   a stop means is provided within said cylinder to prevent movement of each of the floating pistons into a position where said piston is moved to an over-center position by movement of a floating piston within the respective pressure chamber of the floating piston.

3. The mechanism as claimed in claim 2, wherein said stop means comprises a central section of said cylinder having a reduced diameter less than a diameter of said cylinder.

4. The mechanism as claimed in claim 3, wherein said central section of the cylinder defines a portion of a surface of said cylinder, said piston being able to travel over said portion.

5. The mechanism as claimed in claim 2, wherein the first and second inlet/outlet steering ports are respectively located adjacent said stop means to enable fluid flow into the first and second chambers to occur on the opposite sides of the floating pistons from said first sides.

6. The mechanism as claimed in claim 1, wherein said cylinder comprises first and second end pieces, the end pieces defining outer end walls of the first and second pressure chambers, the floating pistons being limited to travel within the first and second pressure chambers.

7. The mechanism as claimed in claim 6, wherein the first and second inlet/outlet centering ports are respectively located adjacent the first and second end pieces to enable fluid flow into the first and second chambers to pressurize said first sides of the floating pistons.

8. The mechanism as claimed in claim 1, further comprising:
   valve means to control flow of fluid through each of the inlet/outlet ports, providing a steering mode and a powered self-centering mode.

9. The mechanism as claimed in claim 8, wherein said valve means are operated when at least one of the valve means is open the other is closed for use in a steering mode.

10. The mechanism as claimed in claim 8, wherein said valve means operate when both valve means are open for use in a powered self-centering mode.

11. The mechanism as claimed in claim 8, wherein the valve means provided for the first and second inlet/outlet steering ports are both open for use in a powered self-centering mode.

12. The mechanism as claimed in claim 8, wherein pressure of fluid supplied to the first and second pressure chambers is the same for use in a powered self-centering mode.

13. The mechanism as claimed in claim 8, further comprising:
   check valves being actuated to control fluid flow out of the first and second inlet/outlet centering ports.

14. The mechanism as claimed in claim 13, wherein only one of said check valves is open for use in steering mode.

15. The mechanism as claimed in claim 14, wherein the check valves are operationally linked respectively to fluid supply lines to the first and second inlet/outlet steering ports, an increase in pressure of fluid in the fluid supply line to either the first or the second inlet/outlet steering port opening a check valve for either the second or the first inlet/outlet centering port respectively thereby allowing movement of the floating piston in the second or first pressure chamber respectively.

16. The mechanism as claimed in claim 15, wherein a check valve is associated with a second check valve, permitting hydraulic fluid to flow respectively to a locking side of the first and second floating pistons.

17. The mechanism as claimed in claim 16, wherein each of said second check valves is associated with a flow restrictor, ensuring a pressure differential on two sides of the respective first and second floating pistons, being biased towards said central position.

18. The mechanism as claimed in claim 16, further comprising:
   mechanical spring means located within said cylinder associated with the first and second floating pistons in order to bias each of the first and second floating pistons independently towards said center position with a predetermined force.

19. The mechanism as claimed in claim 18, wherein said mechanical spring means comprise first and second coil springs, bearing at one end against sides of said cylinder defining respectively part of the first and second pressure chambers on opposite sides of said piston and bearing at an opposite end against shoulders defined respectively by the first and second floating pistons.

20. The mechanism as claimed in claim 8, wherein said valve means provided for the first and second inlet/outlet centering ports comprises a valve linked to a drain line, any hydraulic fluid trapped within said cylinder being discharged when in a powered self-centering mode.

* * * * *